April 1, 1941.                    C. MORRIS                    2,236,879
                             SIGNALING APPARATUS
                          Filed Jan. 11, 1940              2 Sheets-Sheet 1
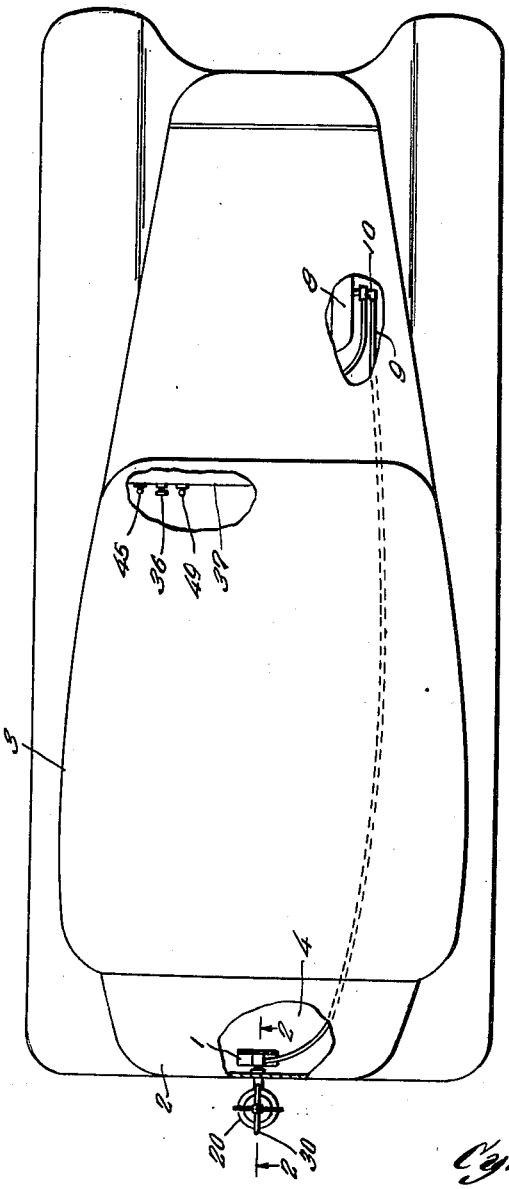
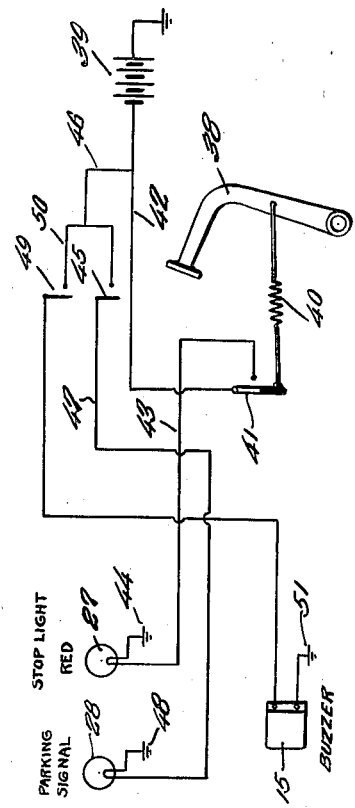
Inventor
Cyril Morris
By Clarence A. O'Brien
and Hyman Berman
                                                        Attorneys

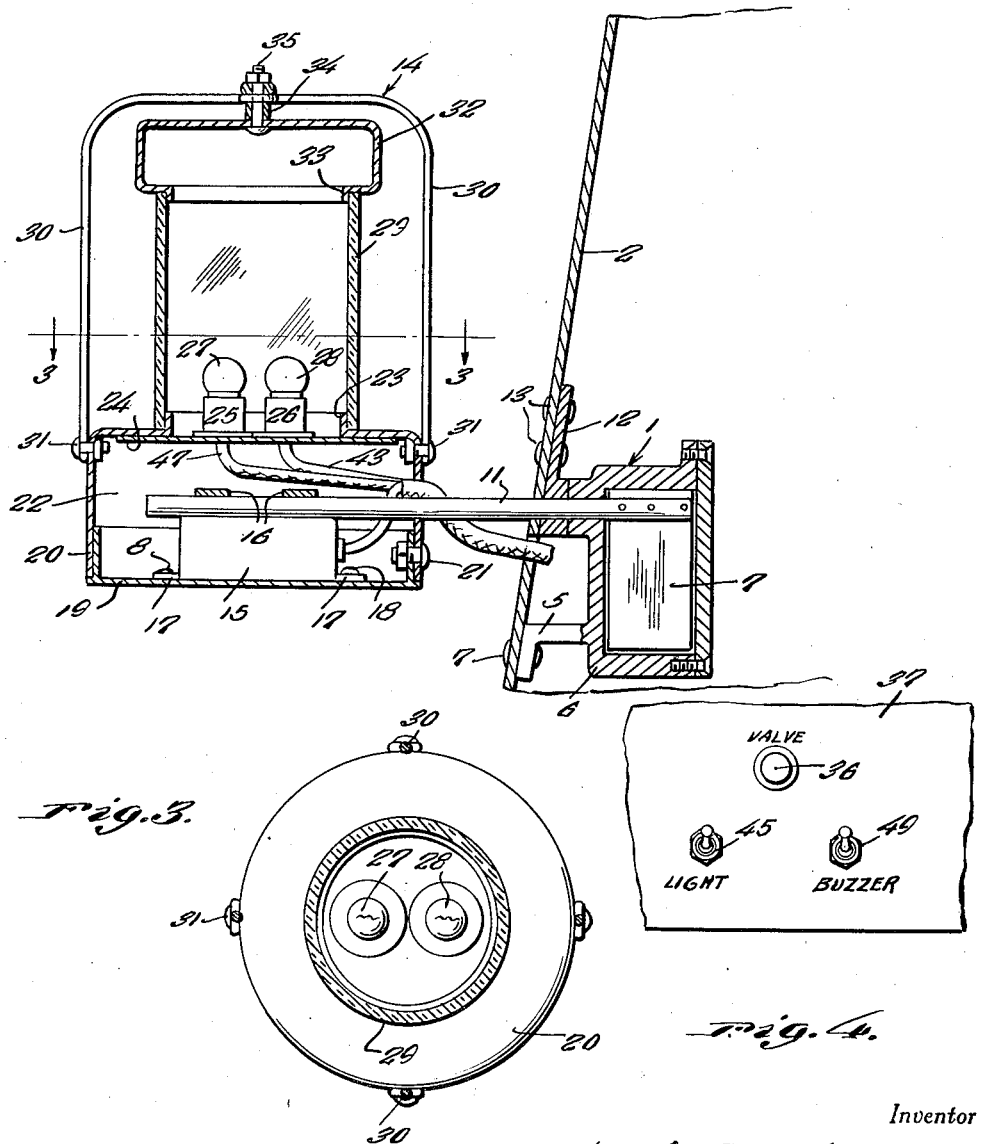

Patented Apr. 1, 1941

2,236,879

UNITED STATES PATENT OFFICE 2,236,879

SIGNALING APPARATUS

Cyril Morris, New Rochelle, N. Y.

Application January 11, 1940, Serial No. 313,436

1 Claim. (Cl. 177—327)

My invention relates to improvements in signaling apparatus for automobiles.

The primary object of the invention is to provide signaling apparatus for automobiles adapted for signifying the intention on the part of a driver to stop and back, and designed particularly to forcibly arrest the attention of the drivers in the rear.

Another object is to provide a stop light for automobiles adapted to be oscillated at will to attract the attention of those behind and energized under control of the brake pedal.

Still another object is to provide a stop light for automobiles adapted for wig-wagging a stop signal to the rear of the automobile and operative by the suction created in the intake manifold of the automobile engine.

Other and subordinate objects are also comprehended by my invention, all of which, together with the precise nature of my improvements will be readily understood when the succeeding description and claim are read with reference to the drawings accompanying and forming part of the invention.

In said drawings:

Figure 1 is a view in top plan of an automobile equipped according to a preferred form of my invention, Figure 2 is a fragmentary view in vertical section taken on the line 2—2 of Figure 1 looking in the direction indicated by the arrows and drawn to an enlarged scale, Figure 3 is a view in longitudinal section taken on the line 3—3 of Figure 2 looking in the direction indicated by the arrows, Figure 4 is a fragmentary view of the instrument panel of the automobile showing the signal controls, and Figure 5 is a diagrammatic view of the signaling circuit.

Referring to the drawings by numerals, according to my invention, a suction motor 1 is suitably mounted in the rear end 2 of the automobile body 3, preferably under the trunk compartment 4, in a hidden position and by means of a bracket 5 provided on the casing 6 of the motor and riveted, as at 7, to said rear end 2. The motor 1 is preferably of the form, to be utilized in connection with windshield wipers and embodies the usual propeller 7 oscillated in a manner well understood under the effects of suction created in the casing 6 alternately upon opposite sides thereof, and through the medium of the vacuum created in the intake manifold 8 of the automobile engine. The numeral 9 designates the usual suction line leading from a tap 10 on the manifold 7, in this instance, to the motor 1. The details of the motor 1 need not be entered into herein, since such motors are well understood in the art.

The motor 1 is provided with a drive shaft 11 extending out of the casing 6 and the rear end 2 of the automobile rearwardly, and horizontally, for oscillation axially by said propeller 7. A suitable bearing 12 is riveted, as at 13, on said rear end 2 for the extension of the shaft 11 therethrough.

A signaling assembly 14 is mounted on the rear end of the shaft 11 for oscillation thereby and which is constructed and arranged as follows. A buzzer 15 is secured, by suitable clamps 16, to said shaft in underslung position and for a purpose presently described. Secured to the underside of the buzzer 15, as by lugs 17, on the buzzer, and screws 18, is a circular pan-like bottom member 19 of an electric lantern including a cup-like base shell 20 of circular form fitting over and around said member 19 and secured thereto, as by bolts 21, to form therewith a chamber 22 for the buzzer 15 and into which the shaft 11 extends. The shell 20 is provided with a central circular neck 23 upstanding therefrom and defining an opening in the top of the shell. A plate 24 is suitably secured to the under side of the top of the shell 20, said plate forming a support for a pair of upstanding electric light sockets 25, 26, of the usual type, fixed thereto in any suitable manner to extend above said neck 23 and having turned therein a pair of electric light bulbs 27, 28, respectively. Upstanding from the shell and fitting around the neck 23 is a cylindrical glass chimney 29. Also upstanding from said shell 20 is a cage structure of crossed arch-like rod members 30 arching over the top of the chimney 29, said members 30 being secured to the side of the shell 20 as by bolts 31. A hollow, open bottom cap member 32, having a depending flange 33 fitting into the top of the chimney 29 surmounts the latter intermediate the same and the top of the cage and is clamped to said chimney by means of a sleeve 34 interposed between the top of the cap member and said cage and a bolt 35 extending through the top of the cage and said sleeve 34 and cap member 32.

Operation of the motor 1 is designed to be controlled in the usual manner, common in connection with windshield wipers, a controlling valve 36 being provided on the instrument panel 37 of the automobile. Such controls, being well understood in the art, a detailed description thereof is not deemed necessary to a proper understanding of the instant invention.

As will now be understood, when the motor 1 is rendered operative, under control of the valve 36, the shaft 11 is caused to oscillate and to correspondingly actuate the described signal assembly 14, so that if either, or both, light bulbs 27, 28 are lit an illuminated signal is wig-wagged at the rear of the automobile to compel attention of those in the rear.

It is contemplated by my invention, that one light bulb, for instance 27, be red to indicate a stop, and the other, 28, be white to serve as a parking light, and that the light bulb 27 be energized, under control of the brake pedal 38 of the automobile, and the light bulb 26 under control of a parking switch, using the ignition battery 39 of the automobile as a source of power. Accordingly, the brake pedal 38 is operatively connected by a suitable connection 40 to a switch 41, suitably located on the automobile, and having one side connected in circuit with the battery 39 by a lead 42, the other side of said switch being connected by a lead 43 to the light bulb 27 and suitably grounded, as at 44, so that when said pedal is depressed said bulb 27 is energized. A suitable parking switch 45 is provided on the instrument panel 37 with one side connected by a shunt lead 46 to the lead 42 and its other side having a lead 47 extended therefrom and grounded, as at 48, with the light bulb 28 interposed therein, whereby said bulb 28 may be energized or cut out at will.

The buzzer 15 provides for signaling the intention to back the automobile, and is designed to be energized at will by the battery 39 under control of a switch 49 on the instrument panel 37 and similar to switch 45. To this end, one side of the switch 49 is connected by a branch 50 to the lead 46 and the other side to one side of said buzzer 15 which is grounded on the other side as indicated at 51.

Obviously the buzzer 15 may be sounded at any time, either with the energizing of the stop light bulb 27, or not, as desired, and either light bulb when energized may be oscillated, or wig-wagged, under control of the valve 36 if desired to attract attention and add to the effectiveness of the signal.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claim.

What I claim is:

In apparatus of the class described, a motor, means to mount said motor in fixed position on an automobile body and including an oscillating rock shaft adapted to extend laterally from said body, an audible signaling unit carried by said shaft in underslung position to be oscillated thereby and act as a counterweight for said shaft, and a signal light casing mounted on said unit and extending above the shaft for wig-wagging said casing under oscillation of said shaft.

CYRIL MORRIS.